Feb. 12, 1935.   R. R. PEELE   1,990,500
MACHINE FOR DIVIDING PLASTIC MATERIAL
Original Filed May 16, 1927   2 Sheets-Sheet 1
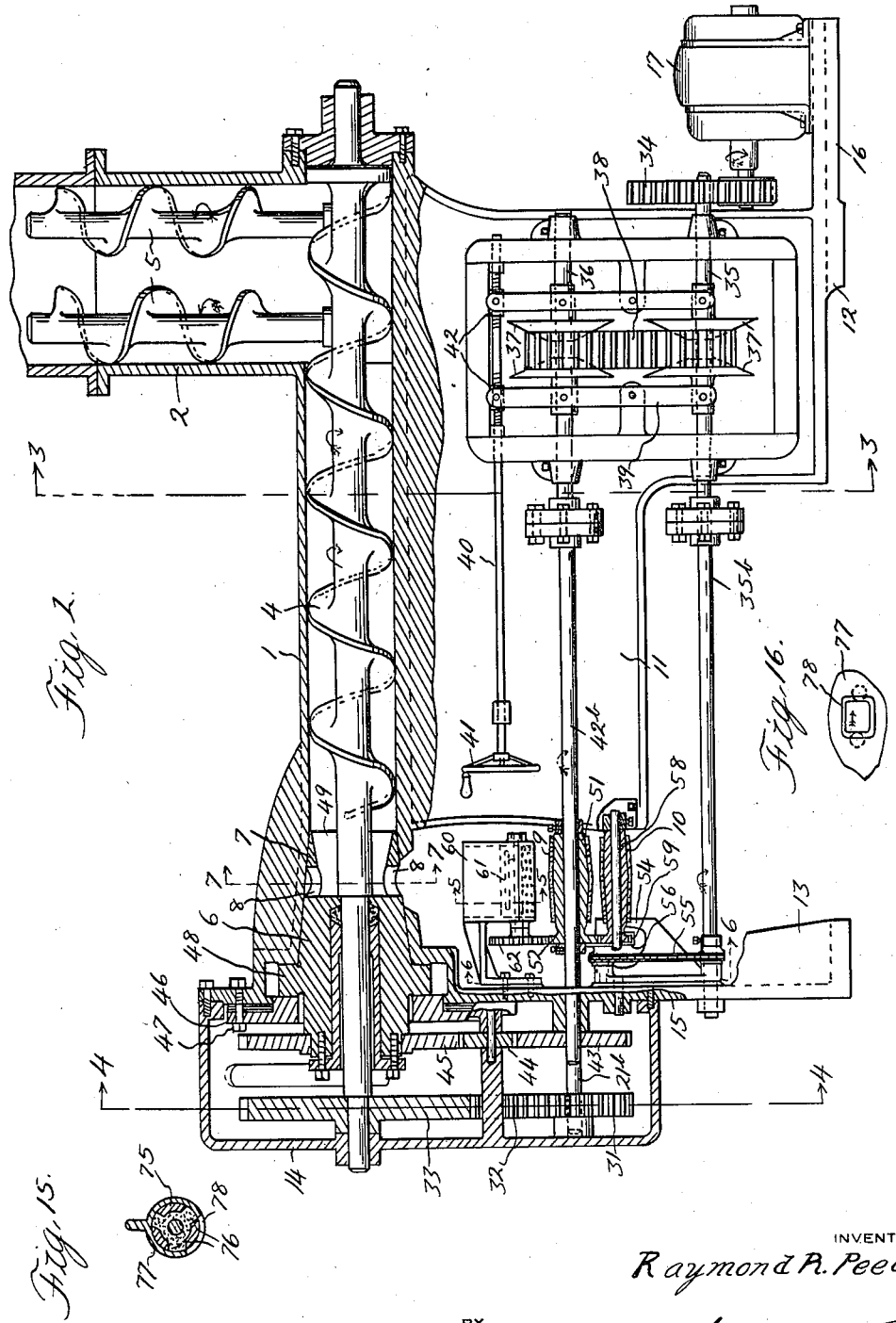
INVENTOR
Raymond R. Peele
BY
Swan & Frye
ATTORNEYS Feb. 12, 1935.  R. R. PEELE  1,990,500
MACHINE FOR DIVIDING PLASTIC MATERIAL
Original Filed May 16, 1927   2 Sheets-Sheet 2
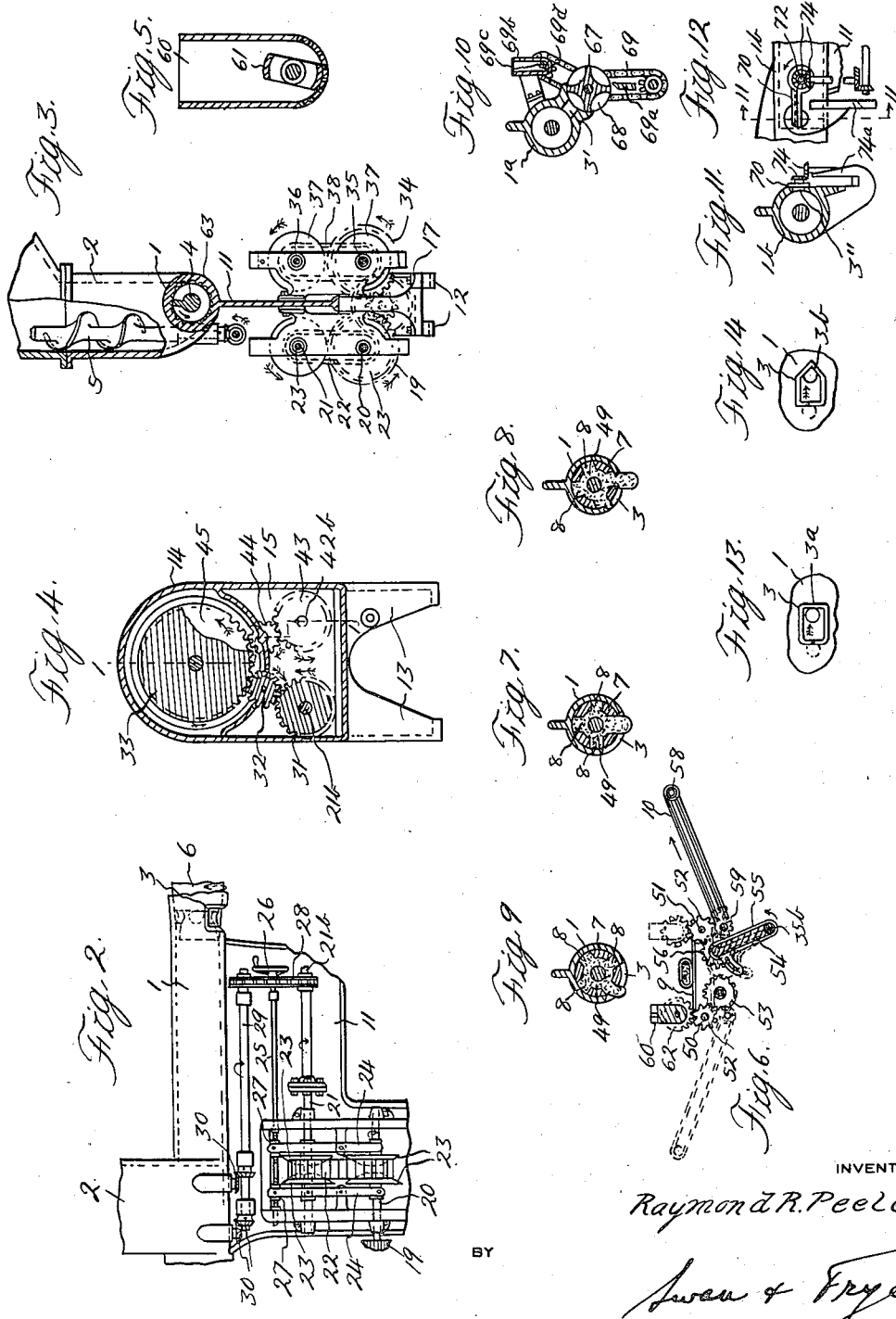
INVENTOR
Raymond R. Peele
BY
Swan & Frye
ATTORNEYS Patented Feb. 12, 1935

1,990,500

UNITED STATES PATENT OFFICE 1,990,500

MACHINE FOR DIVIDING PLASTIC MATERIAL

Raymond R. Peele, Saginaw, Mich.

Substitute for application Serial No. 191,793, May 16, 1927. This application December 16, 1929, Serial No. 414,371. Renewed August 23, 1933

20 Claims. (Cl. 107—15)

This invention relates to machines for continuously forming substantially equal loaves or other portions from a mass of cohesive or gummy material such as molten glass, pulp, pottery clay, white lead, soft soap, putty, salves, semi-solid greases, pastes, lard, sausage, cheese, butter, soft candy, dough, and the like. The particular embodiment of the invention hereinafter described is primarily designed for the treatment of bread dough.

This application is a re-filing of my previous application, Serial Number 191,793, filed May 16, 1927.

The object of the invention is primarily to provide a means for quickly and easily regulating the size of the loaves or batches of material delivered by the machine, and to provide for independent regulation of the rate of such delivery.

This and various other objects the invention attains by the construction hereinafter described and illustrated in the accompanying drawings, wherein:

Figure 1 is a view of the improved machine in side elevation and partial section.

Figure 2 is an elevational view of the other side of said machine, partly broken away.

Figure 3 is a cross sectional view of the machine on the line 3—3 of Figure 1.

Figure 4 is a cross section on line 4—4 of Figure 1, showing two trains of drive gearing, one being partially hidden by the other.

Figure 5 is a cross sectional view taken upon the line 5—5 of Figure 1, showing a flour sprinkler employed in the construction.

Figure 6 is a cross section on the line 6—6 of Figure 1 showing a conveyor system for removing the severed loaves or portions.

Figure 7 is a cross sectional view of the feed chamber of the machine on line 7—7 of Figure 1 showing a cutter head for severing extruded portions of the dough, and showing one such portion almost fully extruded and about to be severed.

Figure 8 is a similar section showing the aforesaid portion partially severed and showing the succeeding portion beginning to extrude.

Figure 9 is a similar section in which the first extruded portion has been completely severed and extrusion of the subsequent portion has further progressed.

Figure 10 is a cross sectional view through a feed chamber and cut-off mechanism of modified construction.

Figure 11 is a cross sectional view of a further modified cut-off mechanism.

Figure 12 is a side elevational view of the same modification.

Figure 13 is a developed view of that portion of the feed chamber of the machine in which an outlet for the material is formed.

Figure 14 is a similar view disclosing an outlet of a modified contour.

Figure 15 is a cross sectional view, somewhat similar to Figures 7, 8, and 9, but showing a slightly modified form of cutter head.

Figure 16 is a developed view of the feed chamber outlet with which the cutter head of Figure 15 is associated.

Primary parts of machine

Describing first the primary elements of the disclosed machine, 1 designates a cylindrical chamber through which bread dough or the like is adapted to be advanced to a dividing means. Said chamber preferably extends horizontally and has a supply hopper 2 upwardly opening from one end thereof, its other end being formed with a downwardly opening outlet 3. Suitable provision is made within the chamber 1 for advancing the material from said hopper to said outlet, a spiral conveyor member 4 being provided for this purpose in the illustrated construction. When required by the nature of the material, some means such as the two vertically disposed spiral conveyor members 5 may also be arranged within said hopper to insure a constant feed of material into the chamber 1. Suitably associated with the outlet 3 is a driven cutter for periodically cutting the extruded portions of dough (or the like) free from the mass of material in the chamber. In that form of the invention shown in Figures 1-9 inclusive, this cutter takes the form of a rotative head 6 within the chamber 1, closing the outlet end thereof, and having a tapered annular flange 7 integrally projecting above the outlet 3 and formed with a suitable number of circumferentially spaced apertures 8 for successively registering with said outlet as the head rotates. The rate of advance of material by the conveyor element 4 and the rate of actuation of the cutter head 6 jointly control the size of the loaves or other severed portions and also the rate of delivery thereof. Said portions are deposited on a horizontally travelling endless conveyor member 9 from which they may be delivered to a second conveyor member 10 leading to any desired location.

Frame of machine

The aforementioned primary elements and the drive mechanism for the same are mounted upon a frame which may be variously formed. As illustrated, the cylindrical feed chamber 1 integrally surmounts a vertical web 11, and the ends of the frame are integrally formed with supporting base portions 12 and 13, and a gear casing 14 is mounted upon a suitable end wall 15 of said frame.

Drive mechanism for spiral conveyor elements

On an extension of the base member 12 is mounted a motor 17, the shaft of which carries a pinion 18 meshing with a gear 19 fast on a shaft 20. A suitable variable speed drive connection is established from the shaft 20 to an overlying shaft 21, the same being preferably of a type permitting rapid, accurate, and easy regulation of the transmitted speed. Thus, as is best seen in Figure 2, a drive belt 22 is mounted upon a pair of pulleys respectively splined on the shafts 20 and 21, each of said pulleys comprising a pair of coned members 23. A pair of levers 24 pivoted between their ends, one at each side of the members 23, are pivotally connected to the latter members and are actuable in unison to move the elements 23 of the lower pulley toward each other while increasing the spaced relation of the upper pair of said elements, or vice versa, thus varying the drive ratio between said pulleys. As illustrated, the adjusting means for the levers 24 comprises a shaft 25 carrying an actuating hand wheel 26 and having right and left hand threaded portions, engaging nuts 27 pivotally carried by the upper ends of said levers. The shaft 21 drives an alined shaft 21b.

Through a suitable chain 28 or the like, the shaft 21b drives an overlying shaft 29 from which the conveyor elements 5 in the hopper are driven through suitable pairs of bevel gears 30, engaging the lower ends of said elements. The main conveyor 4 is also driven from the shaft 21b through a suitable train of gears 31, 32 and 33 arranged in the gear casing 14. It will, of course, be understood that the conveyor elements 4 and 5 are driven in a proper direction to advance the material from the hopper into the chamber 1 and through said chamber toward the outlet 3.

Drive mechanism for cutter head

As is best seen in Figure 3, the pinion 18 on the motor shaft meshes not only with the gear 19 but also with a gear 34 fastened upon a horizontal shaft 35, and from the latter a suitable variable speed drive is established to an overlying shaft 36. The variable speed connection similarly to that hereinbefore described, comprises two-part coned pulleys 37 engaged by a driven belt 38 and adjustable to vary the drive ratio by a pair of levers 39 and a shaft 40. Said shaft carries an actuating hand wheel 41 and has right and left hand threaded portions engaging suitable feed nuts 42 respectively pivoted upon the upper ends of said levers. The shaft 36 drives an alined shaft 42b, and a suitable train of gears 43, 44 and 45, in the gear casing 14 establishes a drive from the shaft 42b to the cutter head 6. The latter may be driven either in the same direction as the main conveyor element 4 or reversely thereto, the essential being that the said conveyor must by its rotation advance the material in the chamber 1 toward said head.

Cutter head

Considering the cutter head 6 now more in detail, it will be noted (see Figure 1) that a gradually tapered portion of said head including the annular flange 7, projects into and is journaled in a correspondingly flared end portion of the chamber 1 and that said head is held in its position of use by an annular plate 46 bolted to the wall 15 as indicated at 47, behind which plate is engaged an annular flange 48 formed upon the mid-portion of the head 6. Obstruction of the chamber 1 by said head compels the material advanced through said chamber to discharge by way of the outlet 3. Both the inner and outer faces of the flange 7 are tapered, thus producing substantially a knife-edge effect that minimizes the resistance offered by the flange 7 to the material advancing into the chamber 49 formed within said flange. The discharge apertures 8 of said flange are preferably circular, but may have any desired form and the outlet 3, through which portions of material are extruded preliminary to severing the same, may also have various forms. It is preferable however, to outwardly flare said outlet so as to reduce the thickness of the edge in contact with the dough and thus minimize adhesion of the dough to such edge also by so flaring said outlet at its edge 3a which acts to shear the extruded material is adapted to exercise substantially a knife effect. As shown in Figure 13, the outlet 3 is of substantially a rectangular shape. For the purpose of handling dough, however, it is preferable to give the said shearing edge a substantially V-form as indicated at 3b in Figure 14, so that pressure of the extruded material into the angle of said edge will accomplish severing by progressive reduction of a neck formed in said angle. Severing in this manner has the advantage of sealing a skin over the severed mass of dough or the like, (known as the rounding operation) and eliminates necessity of a subsequent operation for this purpose. In Figure 7 there is seen an extruded portion of dough, or the like, about to be engaged with the shearing edge 3 (or 3a). As appears in Figure 8 the shearing off of said portion has been partially accomplished and extrusion of another portion is commencing. In Figure 9 the first extruded portion has been fully severed and the extrusion of the succeeding portion has still further progressed. It will be noted that the circumferential extent of the opening 3 is sufficiently greater than that of the apertures 8 to afford an interval for adequate extrusion of a portion of the material through an aperture 8 before said portion engages the shearing edge 3a or 3b.

Belt conveyor drive mechanism

The conveyor belt 9 extends transversely of the machine beneath the outlet 3 of the chamber 1, as best seen in Figure 1, being mounted upon a pair of pulleys, 50 and 51, journaled preferably upon the shafts 21b and 42b, independently of the actuation of said shafts.

With each of said pulleys is integrated or otherwise rigidly connected a drive gear 52, and a gear 53 is permanently meshed with the left hand gear 52, (see Figure 6). An arm 54 is pivoted upon the shaft 35b and a drive from said shaft is established through a chain 55 (in suitable sprockets) to a gear 56 journaled upon the upper end of said arm. Said arm is adjustable from the position shown in full lines in Figure 6 to that indicated in dash lines. In the former position the gear 56 meshes with the right hand gear 52 driving the belt 9 in the direction of the arrow in Figure 6. In the dash line position of said arm the gear 56 meshes with the gear 53 whereby the belt 9 is driven reversely to said arrow. The belt 10 is mounted upon suitable pulleys 58 and extends at one end beneath the belt 9 to receive the loaves or other portions from the latter. Suitable provision is made for driving the belt 10, as for example, by a gear 59 on one of the pulleys 58 meshing with the gear 56.

The belt 10 may be installed at either end of the belt 9 according to the direction in which the latter is to be driven.

Above the advancing end of the belt 9 is mounted a flour container 60 having a perforated lower portion, and an agitator 61 mounted in said container (see Figure 5) is adapted to be driven through a gear 62 from the adjacent gear 52. Rotation of said agitator in said container effects a continuous sprinkling of flour upon the belt 9 in advance of delivery of the dough portions to said belt, whereby any sticking of said portions to said belt is avoided. Delivery of such flour from the belt 9 to the belt 10 serves also to prevent sticking of the dough to the latter.

Dough feed chamber

In order to overcome any tendency of the dough in the chamber 1 to merely turn with the conveyor 4 instead of feeding forward, it is desirable to fashion said chamber interiorly to restrain any such rotation. This is accomplished, as shown in Figure 3, by forming longitudinal channels 63 in the inner face of said chamber. The engagement of the dough in said channels thus sufficiently resists rotation to insure a forward feeding movement of the dough responsive to rotation of the member 4.

Modifications

Describing now the modification shown in Figure 10, 1a is a feed chamber such as already described, and 3' an outlet therefrom for the dough, or the like. Exteriorly adjacent to said outlet is rotatably mounted a cutter head 67 peripherally formed with a plurality of pockets 68 which successively register with the outlet 3' through rotation of said head. The latter is driven in the direction of the arrow in Figure 10 by a chain 69 or the like. The weight of the portions of dough in the pockets 68 will ordinarily cause said portions to drop from said pockets as the latter approach their downwardly opening positions. However, it is preferred to dispose below the head 67 an ejector 69a presenting a beveled edge in close proximity to the head so as to dislodge the lumps of dough from said pockets, if necessary. To minimize the possibility of the dough adhering to the walls of the pockets 68, it is preferred to arrange a flour sprinkler 69b (similar to that shown in Figure 5) above the head 67 and to continuously drive a suitable agitator 69c within said sprinkler by a chain 69d or the like.

In the modification illustrated in Figures 11 and 12, a cutter blade 70 is again mounted exteriorly of the feed chamber 1b and revolves across the outlet 3'' through which the dough is extruded. Said blade is mounted upon a stub shaft 72 and is adapted to be continuously driven through a suitable gearing 74. If the severed portions tend to adhere to the blade 70, they will be released from said blade by encountering the arm 74a which projects upwardly adjacent to said blade.

In the modification illustrated in Figures 15 and 16, a hollow cutter head 75 formed with circumferentially spaced openings 76 is rotatable within a dough feed chamber 77 to periodically sever portions of dough extruded through an outlet 78 in the bottom of said chamber. This construction differs from that first described only in that it provides a lesser number of discharge openings in the cutter head, consequently increasing the circumferential spacing of said openings, so that the extrusion and severing of one portion is completely accomplished before the next portion begins to extrude.

Operation

In the operation of the described machine, dough or other cohesive material is continuously fed from the hopper 2 by the conveyor elements 5 into the chamber 1, and is continuously advanced through said chamber by the element 4 to the cutter head 6. As each aperture 8 of said head registers with the outlet 3 a portion of the dough is first extruded through said aperture and outlet, and is finally severed from the original mass by the shearing co-action of the edges of said aperture and outlet. The operator, by increasing the speed of the conveyors 4 and 5, relative to that of the cutter head is able to increase the size of the severed portions and by increasing the speed of the conveyor elements 4 and 5 and also of the cutter head, the rate of delivery of the severed portions may be increased without affecting their size. By thus properly relatively proportioning the rate of advance of the material by said conveyor elements to the rate of actuation of the cutter head it is feasible to accurately control both the size of the delivered portions of material and the rate of their delivery.

It will appear from the foregoing description and explanation of the machine, that when the same is operating, the extrusion of dough is continuous, each cutting off of an extruded portion being preceded to some extent by the extrusion of another portion. The arrangement is such that the total effective area of apertures through which extrusion takes place is at all times substantially uniform, so as to give substantial uniformity to the resistance or back pressure against the forward flow of dough. By thus avoiding variations in the pressure under which the dough is advanced, there is attained a quite definite uniformity in the volume of dough embraced in each severed portion.

It will be readily understood that the feed elements 5 in the hopper may be omitted if the described machine is used for handling material of sufficiently fluid character to discharge by gravity from the hopper into the feed chamber 1. It will also be evident that other types of feed members than the elements 4 and 5 might be used both in the hopper and in the feed chamber. It is also to be understood that the invention in its broader aspects is not limited to the disclosed types of dough cutters. The speed-regulable drives from the shaft 20 to the shaft 21, and from the shaft 35 to the shaft 36 might also be given various forms other than that shown. It is to be understood therefore, that the invention is submitted as embracing such changes as are above discussed, and all other modifications such as properly come within the spirit and scope of the appended claims.

What I claim is:

1. In a device of the character described, the combination with a chamber having an inlet and an outlet, of means for advancing cohesive material through said chamber toward said outlet to be extruded therethrough, means associated with said outlet for periodically severing the extruded material, means for regulating the rate of advance of the material through said chamber, and the rate of periodic severing each independently of the other.

2. In a device of the character described, the combination with a chamber having an inlet and an outlet for cohesive material, of means for advancing such material through said chamber toward said outlet to be extruded therethrough, a cutter head rotatable in said chamber and interposed between its interior and its outlet, said cutter head being formed with an inlet in its end and an outlet opening registrable with said outlet in the chamber to permit extrusion of material, and means for rotatably actuating said cutter head.

3. In a device of the character described, the combination with a chamber having an inlet and an outlet for cohesive material, of means for advancing such material through said chamber toward said outlet to be extruded through said outlet, a tubular cylindrical cutter head rotatable in said chamber having an open end appurtenant said chamber to admit material thereinto and formed with a circumferential series of openings registrable successively with said outlet through rotation of said head, and means for rotatively actuating said head.

4. In a device of the character described, the combination with a chamber having an inlet and an outlet for cohesive material, of means for advancing such material through said chamber toward said outlet, a cutter head rotatable in said chamber and interposed between the interior thereof and the outlet, said cutter head having an inlet opening in one end thereof for receiving the advancing material, and formed with an outlet opening through the wall of said chamber registrable with said outlet for the extrusion of material, and means for rotatively actuating said cutter head.

5. In a device of the character described, the combination with a chamber having an opening for the discharge of cohesive material formed with a V-shaped shearing edge receding from the center of said opening, of a cutter head rotatable in said chamber across said opening toward said shearing edge, and means for rotatively actuating said cutter head.

6. In a device of the character described, the combination with a chamber having an outlet, of means for delivering cohesive material to said outlet, to be extruded therethrough, means associated with said outlet for periodically severing the extruded material, and means for regulating the rate of delivery of the material to said outlet and the rate of periodic severance each independently of the other.

7. In a device of the character described, the combination with a chamber having an inlet and an outlet, of a member rotatable in said chamber for feeding cohesive material through said chamber toward said outlet, to be extruded therethrough, a coaxial rotative cutter member within said chamber for periodically severing the extruded material, means for driving said feed member, means for driving said cutter member, and means for independently regulating the driven speed of said feed member and cutter member.

8. In a device of the character described, the combination with an elongated feed chamber for cohesive material having a tapering flare and an outlet at one end, of means within said chamber for feeding material toward said end, a head rotative in and conforming to said flared portion of said chamber, drive means for said head, and a cutter member carried by said head associated with said outlet for periodically severing material extruded through said outlet.

9. In a device of the character described, the combination with an elongated chamber having an outlet adjacent to an end portion thereof, a head journaled in said end portion, forming a closure for said chamber, a feed member disposed in said chamber and journaled in said head for advancing material to said outlet to be extruded therethrough, a cutter member carried by said head and associated with said outlet for severing material extruded therethrough, and means for driving said head and feed member at different speeds.

10. In a device of the character described, the combination with a chamber having an inlet and an outlet, of a member rotatable in said chamber for feeding cohesive material toward said outlet, to be extruded therethrough, a cutter member rotative coaxially with said feed member for periodically severing the extruded material, and means for driving said feed member and cutter member at different speeds.

11. In a device of the character described, the combination with a chamber having an inlet and an outlet for cohesive material, of a member rotatable in said chamber for feeding material toward said outlet, to be extruded therethrough, a cutter member rotatable coaxially with said feed member for periodically severing the extruded material, drive means for the cutter member, and means extending through the cutter member for driving said feed member independently of the cutter member.

12. In a device of the character described, the combination with a chamber having an outlet for the discharge of cohesive material, of members independently rotatable in said chamber for advancing material to said outlet and for regulating its discharge through said outlet.

13. In a device of the character described, the combination with a chamber having an outlet, of a rotative member in said chamber for advancing material to said outlet, a rotative member associated with said outlet for regulating the discharge therethrough, independent mechanisms for driving the two said rotative members, and means associated with said mechanisms for independently regulating the speed of actuation of said members.

14. In a severing device for cohesive material, a body portion having an exposed outlet opening, means for advancing such material toward and forcing it through said opening, and means for governing the extrusion of the material and for dividing the same into predetermined lengths, including a gate member arranged to control the outlet of the body and having an inlet communicating with the body member to receive material forced therethrough, said gate member also having a plurality of openings therein and being so movable relatively to the outlet opening as to successively register said openings in the gate member with the outlet openings, and to partially register one before completely closing the one previous, thereby maintaining substantially constant the effective outlet represented by the total area of such registration.

15. In a dividing device for cohesive material, a body portion having an exposed outlet opening, means for advancing cohesive material toward and forcing it through the outlet opening, and means for governing the extrusion of the material and for dividing the same into predetermined lengths, including a gate member movably arranged appurtenant and adapted to control the outlet opening and having spaced inlet and outlet openings therein, said outlet openings in the body portion and gate member being periodically registrable upon movement of one relatively to another but so disposed that upon movement of the gate one opens as another closes, whereby the total area of registration remains substantially constant to permit constant pressure relief through the exposed outlet.

16. In apparatus for handling cohesive material, conveying means comprising a plurality of screw conveyors adapted to successively advance and deliver the material one to another and each substantially rectilinear but angularly disposed relatively to the succeeding conveyor, the adjoining ends of said conveyors being arranged out of a common plane, whereby one may be projected across and beyond another.

17. In apparatus for handling cohesive material, conveying means comprising a plurality of elongated passageways angularly disposed and having communicating ends, and screw conveyors arranged in said passageways for successively advancing cohesive material therethrough in angular directions, the adjoining ends of said screw conveyors being arranged out of a common plane and one being projected across and beyond another, and means for driving at least one of said conveyors from such projecting end.

18. In a dividing device for cohesive material, a body portion having an exposed outlet opening, means for advancing cohesive material toward and forcing it through the outlet opening, and means for governing the extrusion of the material and for dividing the same into predetermined lengths, including a movable gate member having an inlet opening therein in constant communication with said body portion to receive material forced through the latter, and another portion movable to valve said outlet opening and having a plurality of valve openings therein arranged closer together than the width of the outlet opening, whereby upon movement of the gate member one of said valve openings begins to register with the outlet opening before another closes.

19. In a dividing device for cohesive material and the like, a body portion having an exposed outlet opening therein, means for advancing the material toward and forcing it through the outlet opening, and means for governing the extrusion of the material and for dividing the same into predetermined lengths, including a rotatable gate member having an inlet opening in an end thereof and in constant communication with said body portion to receive material forced through the latter, and a plurality of circumferentially spaced valve openings arranged to be periodically registrable with the outlet opening upon rotation of the gate member, and so disposed that one opens as another closes, to maintain the exposure of the outlet and prevent the accumulation of undesired pressure within the body member.

20. In a machine for handling dough and like materials, a delivery portion for discharging separated charges of material, an endless belt conveyor arranged beneath and adapted to receive such separated charges, reversible driving means for said conveyor including gearing and sprocket means at each end of said conveyor, and additional conveying means including a portion connectable to the gearing at either end of said first mentioned conveyor.

RAYMOND R. PEELE.